US012613456B2

(12) United States Patent　　　　(10) Patent No.: US 12,613,456 B2

Murata　　　　　　　　　　　　　(45) Date of Patent: Apr. 28, 2026

(54) CAMERA SUPPORT STRUCTURE

(71) Applicant: SUBARU CORPORATION, Tokyo (JP)

(72) Inventor: Yuto Murata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 22 days.

(21) Appl. No.: 18/824,336

(22) Filed: Sep. 4, 2024

(65) Prior Publication Data

US 2025/0110393 A1　　Apr. 3, 2025

(30) Foreign Application Priority Data

Sep. 29, 2023　(JP) ................................. 2023-169355

(51) Int. Cl.
　　*G03B 17/56*　　　(2021.01)
　　*B60R 11/00*　　　(2006.01)

(52) U.S. Cl.
　　CPC ............ *G03B 17/561* (2013.01); *B60R 11/00* (2013.01); *B60R 2011/004* (2013.01); *B60R 2011/0085* (2013.01)

(58) Field of Classification Search
　　CPC ...... G03B 17/561; G03B 17/04; G03B 30/00; G03B 17/08; B60R 11/00; B60R 2011/004; B60R 2011/0085; B60R 2011/0084; B60R 11/04
　　See application file for complete search history.

(56) References Cited

U.S. PATENT DOCUMENTS

2022/0094831 A1* 3/2022 Lang ...................... G03B 17/08

FOREIGN PATENT DOCUMENTS

| | | | | |
|---|---|---|---|---|
| CN | 107139856 | A * | 9/2017 | ............. B60R 11/04 |
| CN | 108833750 | A * | 11/2018 | ............. B60R 11/04 |
| CN | 114253049 | A * | 3/2022 | ........... G03B 17/561 |
| CN | 116872856 | A * | 10/2023 | ............. B60R 11/04 |
| DE | 102013018022 | A1 * | 5/2015 | ............. B60R 11/04 |
| EP | 2 722 234 | A1 | 4/2014 | |
| JP | 2006251196 | A * | 9/2006 | |
| JP | 2014-080081 | A | 5/2014 | |
| JP | 2018-131152 | A | 8/2018 | |
| JP | 2019-171958 | A | 10/2019 | |
| WO | WO-2018105245 | A1 * | 6/2018 | ............. B60R 11/04 |

* cited by examiner

*Primary Examiner* — Timothy J Henn
(74) *Attorney, Agent, or Firm* — Smith, Gambrell & Russell, LLP

(57)　　　　　　ABSTRACT

A camera support structure for supporting a camera disposed adjacent to an exterior member includes a cylinder fixed to a vehicle body, a piston, an annular bag, and an interlocking member. The piston is inserted into the cylinder such that the piston is a relatively displaceable along an axial direction of the cylinder. The piston is configured to support the camera. The annular bag is provided between a peripheral edge of a lens of the camera and an end portion of the cylinder. The camera projects from the end portion of the cylinder. The interlocking member couples the exterior member and the piston. The interlocking member moves the piston in a direction in which the lens is retracted into the cylinder in response to displacement of the exterior member. The annular bag covers at least a part of a surface of the lens in response to movement of the piston.

8 Claims, 4 Drawing Sheets

VEHICLE FRONT SIDE

VEHICLE FRONT SIDE

CAMERA SUPPORT STRUCTURE

CROSS-REFERENCE TO RELATED APPLICATIONS

The present application claims priority from Japanese Patent Application No. 2023-169355 filed on Sep. 29, 2023, the entire contents of which are hereby incorporated by reference.

BACKGROUND

The disclosure relates to a camera support structure for supporting a camera provided in a vehicle, such as an automobile.

Techniques regarding support structures for cameras provided in vehicles, such as automobiles, are disclosed in Japanese Unexamined Patent Application Publication (JP-A) No. 2014-80081, JP-A No. 2018-131152, and JP-A No. 2019-171958.

SUMMARY

An aspect of the disclosure provides a camera support structure for supporting a camera disposed adjacent to an exterior member of a vehicle. The camera support structure includes a cylinder fixed to a vehicle body, a piston, an annular bag, and an interlocking member. The piston is inserted into the cylinder such that the piston is a relatively displaceable along an axial direction of the cylinder. The piston is configured to support the camera. The annular bag is provided between a peripheral edge of a lens of the camera and an end portion of the cylinder. The camera projects from the end portion of the cylinder. The annular bag is made of an elastic material. The annular bag is configured to store a gas with a pressure higher than an atmosphere pressure. The interlocking member couples the exterior member and the piston to each other. The interlocking member is configured to move the piston in a direction in which the lens is retracted into the cylinder in response to displacement of the exterior member. The annular bag is configured to cover at least a part of a surface of the lens in response to movement of the piston.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
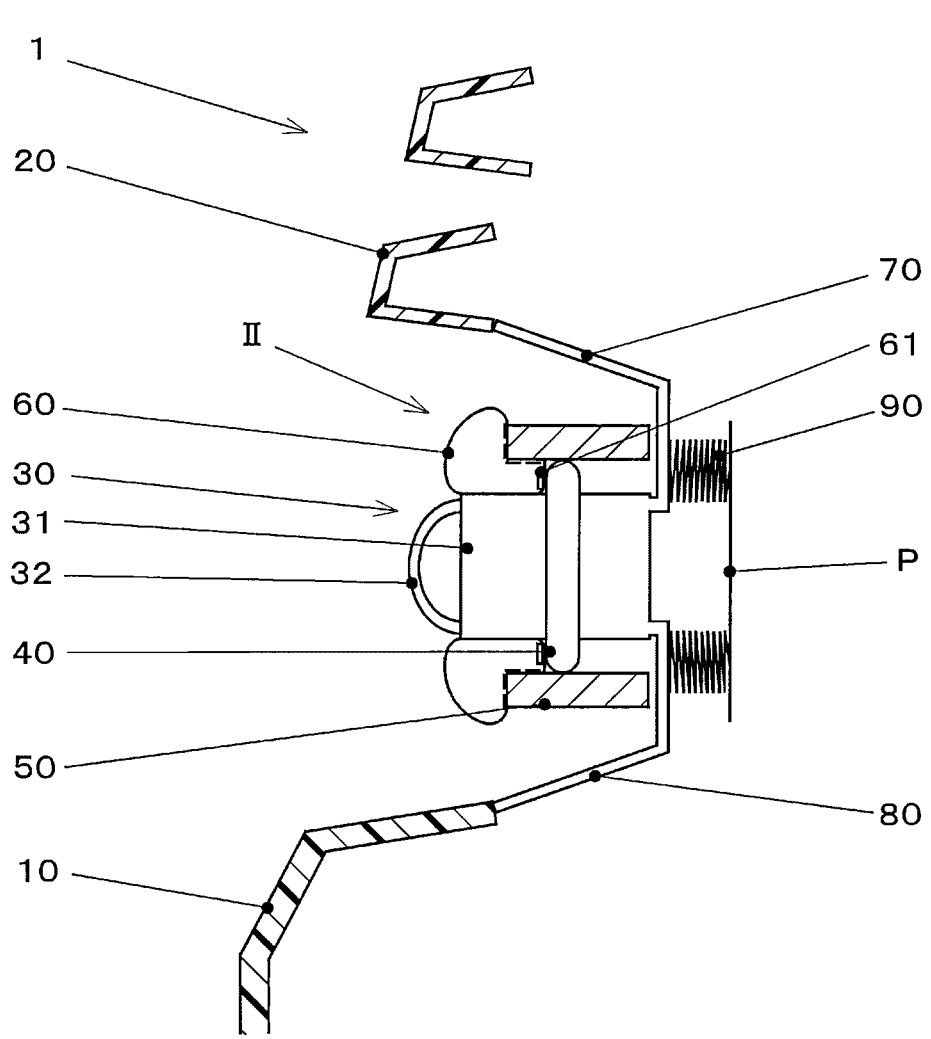
FIG. 1 is a schematic cross-sectional view of a front structure of a vehicle having a camera support structure according to an embodiment of the disclosure.

JP-A No. 2014-80081 describes a mounting structure for vehicle cameras that can easily adjust the mounting angle and has an excellent appearance. In this mounting structure, since a pin provided on an end side of the mounting bracket is pivotally supported by a garnish fixed to a vehicle body, and the base end side of the mounting bracket is fixed to the garnish at two or more different angles by a bolt, the mounting angle of the camera can be easily adjusted, and an optimum image can be obtained by adjusting the mounting angle of a common camera even when the mounting height of the camera differs depending on the vehicle type.

In addition, since the pin is provided on an end side of the mounting bracket, the amount of projection from the vehicle body of the camera supported by the mounting bracket can be reduced, the movement amount of the end of the camera can be reduced to improve the appearance when the angle is adjusted, and the camera can be protected by the mounting bracket.

JP-A No. 2018-131152 describes a mounting structure for a device for detecting front states of a vehicle. The mounting structure includes a rear bracket mounted on a front bulkhead located behind a front grille and a front bracket that extends to the front from the rear bracket and supports the device for detecting front states, and the front bracket is coupled to the front grille and is coupled to the rear bracket such that the front bracket can be displaced backward when receiving a load higher than a predetermined value such that the size of an emblem formed on a front grille does not become large and the device for detecting front states operates normally in an initial state for a long period of time even if a minor front collision occurs.

JP-A No. 2019-171958 describes a technique that causes the housing of a camera to swing in a direction approaching a rear portion of the vehicle body about a support shaft against a biasing force of a first biasing member to prevent the camera from being broken during a collision with an obstacle when the obstacle makes contact with the housing. When an obstacle collides with a bumper fascia and pushes an end portion (rear end) of a frame via the bumper fascia while deforming the bumper fascia, the frame moves linearly in the direction approaching the rear portion of the vehicle body against a biasing force of a second biasing member while being guided by a guide.

A front camera is intended to reduce breakage when a minor collision occurs.

For example, to obtain a necessary angle of view for imaging a road surface immediately ahead, the lens closest to the object is generally a convex lens that projects to the vehicle front side. In such a convex lens, since the lens may have a scratch even if a collision does not affect the operation of the camera, the lens may be replaced eventually.

It is desirable to provide a camera support structure that can suppress the lens from being damaged when a minor collision occurs.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A camera support structure according to the embodiment supports a camera that is provided in a front portion of the vehicle body of an automobile, such as a passenger vehicle, and takes an image of the vehicle front side by using a wide-angle lens.

FIG. 1 is a schematic cross-sectional view of a front structure of a vehicle having a camera support structure according to the embodiment.

Figure 2:
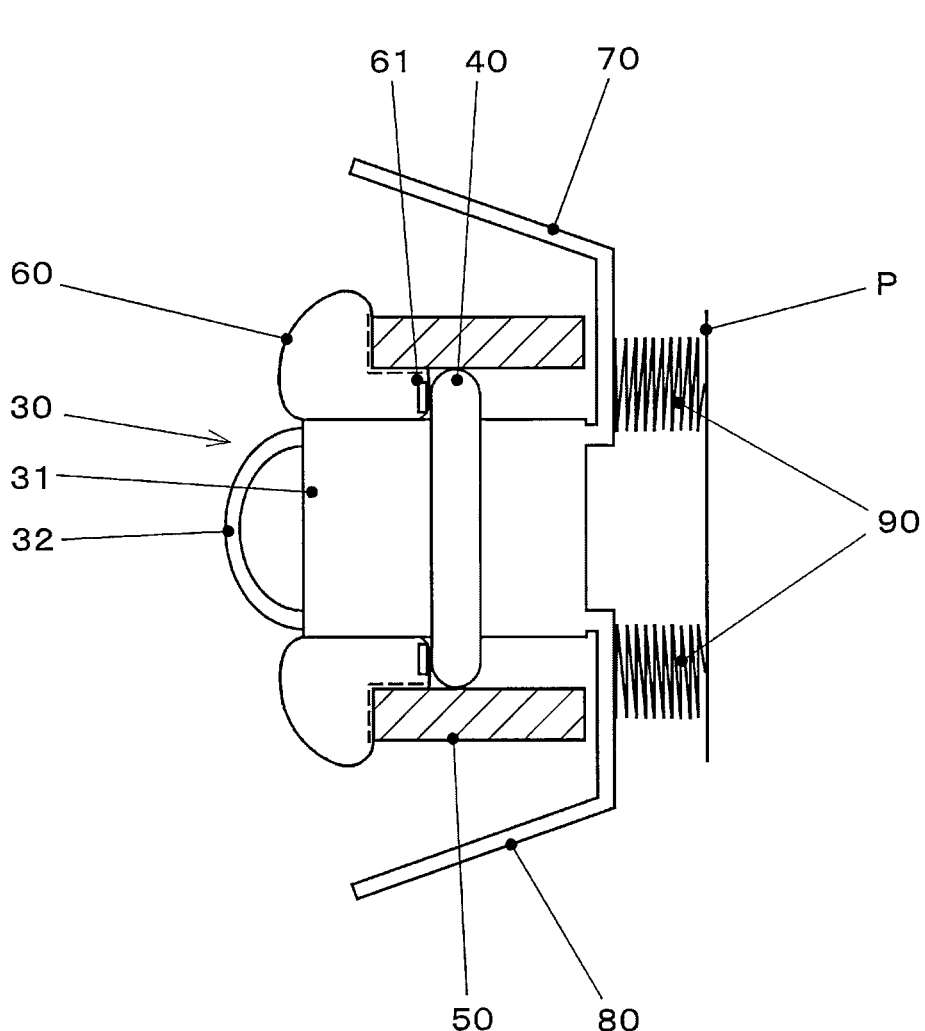
FIG. 2 is an enlarged view of a portion indicated by II in FIG. 1.

FIG. 2 is an enlarged view of a portion indicated by II in FIG. 1.

A vehicle 1 includes a bumper face 10, a grille 20, a camera 30, a piston 40, a cylinder 50, an annular bag 60, an upper interlocking member 70, a lower interlocking member 80, springs 90, and the like.

The bumper face 10 is a resin exterior member provided below the front portion of the vehicle body.

The bumper face 10 is provided below the camera 30.

The front end portion of the bumper face 10 is disposed so as to project to the vehicle front side beyond a lens 32 of the camera 30 and the grille 20.

The grille 20 is a resin exterior member provided in the front portion of the vehicle body.

The grille 20 is formed in a grid to guide air to a radiator core (not illustrated) or the like disposed behind the grille 20.

The grille 20 is provided above the camera 30.

The front end portion of the grille 20 is disposed so as to project to the vehicle front side beyond the lens 32 of the camera 30.

The camera 30 is an imaging device that takes an image in front of the vehicle 1.

The camera 30 includes a housing 31 and the lens 32.

The housing 31 is a cabinet in which a CCD or CMOS solid-state imaging device, a driving device thereof, and the like are accommodated.

The outer shape of the housing 31 is formed in, for example, a cylindrical shape, and the central axis thereof is disposed in parallel to the longitudinal direction of the vehicle.

The lens 32 is an optical element that focuses an image in front of the vehicle onto a solid-state imaging device. The optical element of the lens 32 closest to an object (on the vehicle front side) is a convex lens that projects from the front end portion of the housing 31 to the vehicle front side.

The piston 40 is a flange member that projects radially outward from the outer peripheral surface of the housing 31 of the camera 30.

The piston 40 is provided in a middle portion in the longitudinal direction of the housing 31.

The piston 40 is fixed to the housing 31. Alternatively, the piston 40 may be permanently affixed to the housing 31 of the camera 30.

The piston 40 is inserted into the inner diameter side of the cylinder 50 together with the housing 31 of the camera 30.

The outer peripheral edge of the piston 40 makes contact the inner peripheral surface of the cylinder 50.

The cross-section of the outer peripheral edge of the piston 40 taken along a plane including the optical axis of the camera 30 has an arc shape with a convex portion on the outer diameter side.

The cylinder 50 is a cylindrical member that accommodates a part of the camera 30 and the piston 40 on the inner diameter side.

The cylinder 50 is disposed such that the central axis thereof is parallel to the vehicle longitudinal direction.

The camera 30 and the piston 40 are displaceable in the vehicle longitudinal direction with respect to the cylinder 50.

The cylinder 50 is fixed to the vehicle body via a bracket (not illustrated).

The annular bag 60 is a member that seals a gap between a front portion of the housing 31 of the camera 30 and a front portion of the cylinder 50.

The annular bag 60 is formed of a flexible member, such as a rubber-based material, and has a circular tube shape that surrounds the lens 32.

A gas (typically, compressed air) with a pressure higher than the atmospheric pressure is introduced from a high pressure gas supply source (not illustrated) into the annular bag 60 and is filled in the annular bag 60.

The high pressure gas supply source may include, for example, a pump that performs a pumping operation according to the suspension stroke of the vehicle 1.

As illustrated in FIGS. 1 and 2, when the vehicle does not collide, the annular bag 60 projects radially outward from the outer peripheral edge of the lens 32 so as not to obstruct the angle of view of the lens 32.

An exhaust member 61 is provided at a position at which the annular bag 60 faces the front surface of the piston 40.

The exhaust member 61 is disposed between the outer peripheral surface of the housing 31 of the camera 30 and the inner peripheral surface of the cylinder 50.

The exhaust member 61 is in contact with the front surface of the piston 40 when a collision of the vehicle does not occur. In this state, the exhaust member 61 seals the high pressure gas in the annular bag 60.

When the piston 40 moves backward with respect to the cylinder 50 during a collision of the vehicle, the exhaust member 61 releases a part of a high pressure gas G in the annular bag 60 to the inner diameter side of the cylinder 50.

The upper interlocking member 70 is a member that couples the rear end portion of the housing 31 of the camera 30 and the lower portion of the grille 20 to each other.

The upper interlocking member 70 detects an external input to the grille 20 and transmits the external input to the housing 31.

When the grille 20 moves backward with respect to the vehicle body due to a minor collision of the vehicle, the upper interlocking member 70 causes the housing 31 of the camera 30 to move backward with respect to the cylinder 50 as interlocking operation.

The lower interlocking member 80 is a member that couples the rear end portion of the housing 31 of the camera 30 and an upper portion of the bumper face 10 to each other.

The lower interlocking member 80 detects an external input to the bumper face 10 and transmits the external input to the housing 31.

When the bumper face 10 moves backward with respect to the vehicle body due to a minor collision of the vehicle, the lower interlocking member 80 causes the housing 31 of the camera 30 to move backward with respect to the cylinder 50 as interlocking operation.

The springs 90 are biasing members, such as compression coil springs, provided between a panel P that constitutes a part of the vehicle body and the rear end portions of the upper interlocking member 70 and the lower interlocking member 80.

The springs 90 bias the camera 30 in the forward direction with respect to the vehicle body.

The springs 90 serve as stroke regulation members that regulate the allowable stroke range of the piston 40 with respect to the cylinder 50.

The behavior of the camera support structure according to the embodiment when a minor collision of the vehicle 1 occurs will be described below.

Figure 3:
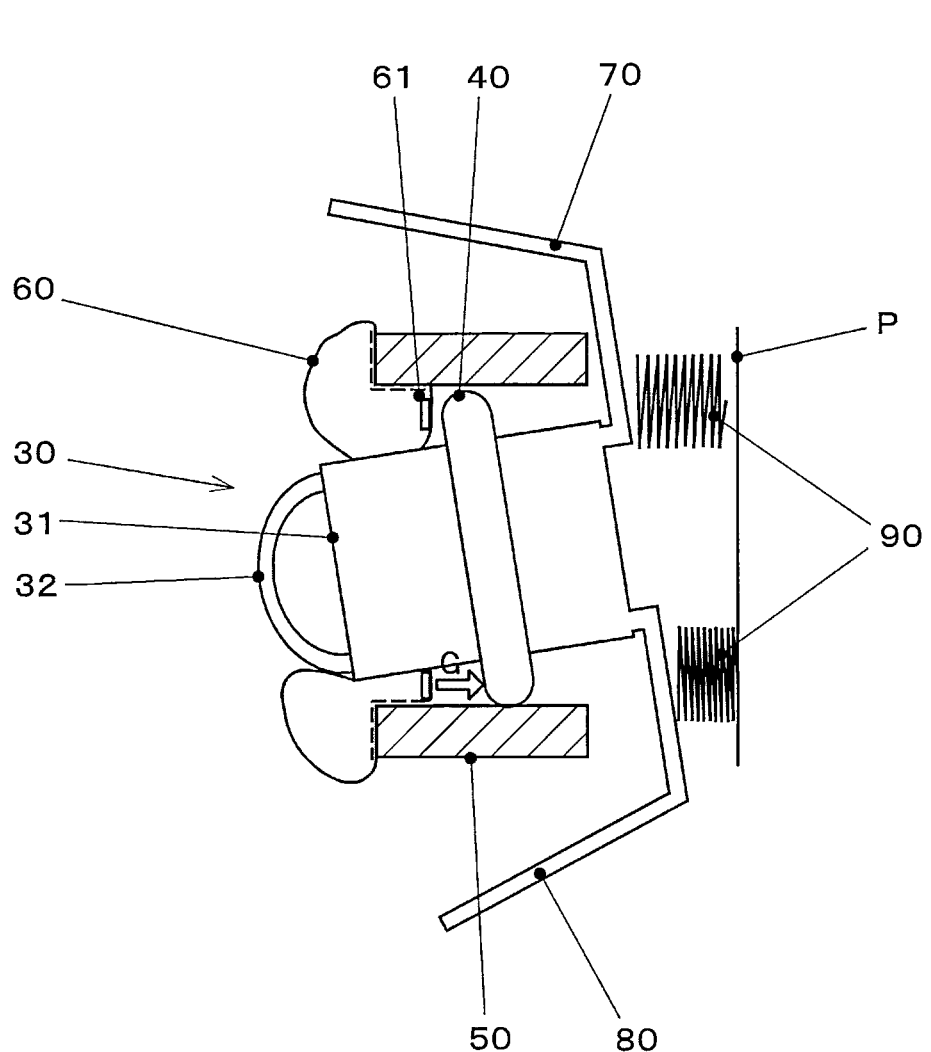
FIG. 3 is a diagram illustrating a state of the camera support structure according to the embodiment at an initial stage of a collision.

FIG. 3 is a diagram illustrating a state of the camera support structure according to the embodiment at an initial stage of a collision.

In the example illustrated in FIG. 3, the bumper face 10 moves backward due to an external input, the lower inter-locking member 80 is pushed to the rear side, and accordingly, the camera 30 moves backward with respect to the cylinder 50 while the front side of the optical axis is inclined downward.

As the piston 40 moves backward with respect to the cylinder 50, a part of the high pressure gas G in the annular bag 60 flows into the gap between the cylinder 50 and the housing 31 of the camera 30 from the rear end portion of the annular bag 60.

Figure 4:
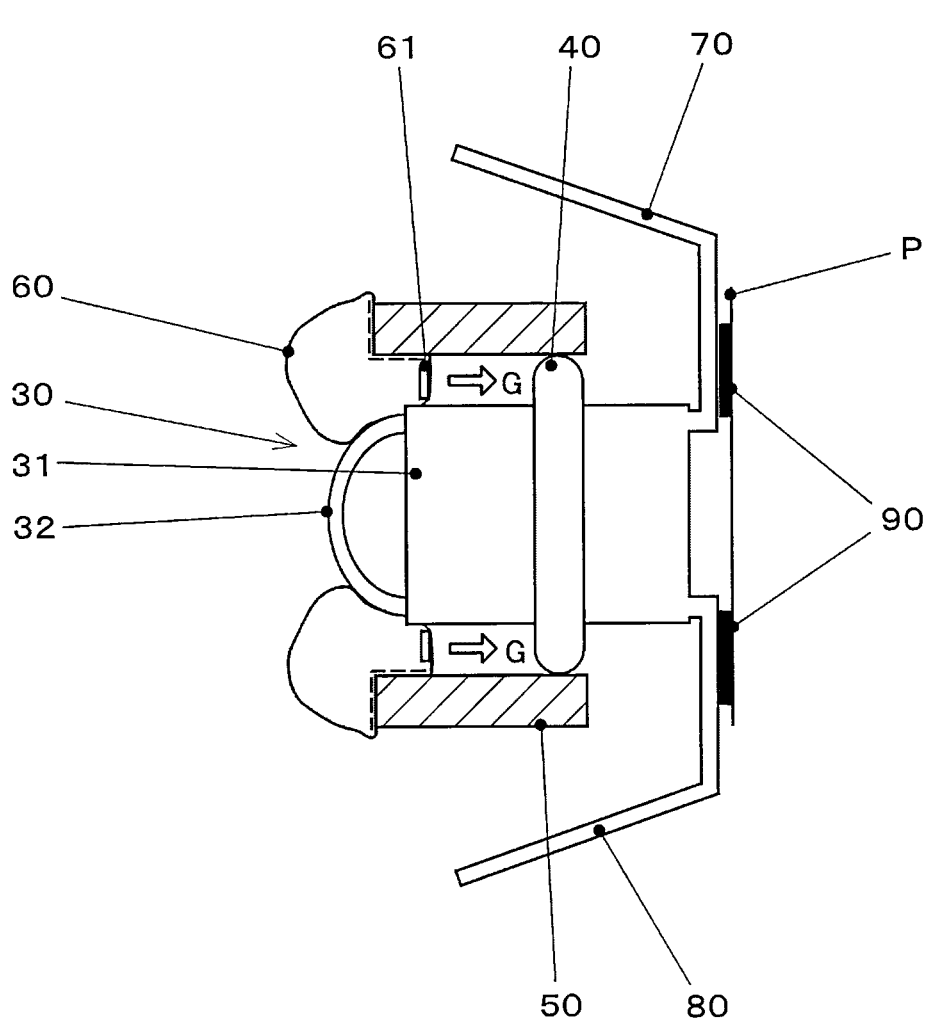
FIG. 4 is a diagram illustrating a state of the camera support structure according to the embodiment at a later stage of a collision.

FIG. 4 is a diagram illustrating a state of the camera support structure according to the embodiment at a later stage of a collision.

In the state illustrated in FIG. 4, the springs 90 are completely compressed until line-to-line contact occurs, and the piston 40 moves backward to the maximum allowable stroke with respect to the cylinder 50.

The high pressure gas G in the annular bag 60 is exhausted from the exhaust member 61 into the cylinder 50, and the internal pressure of the annular bag 60 decreases.

The high pressure gas G introduced into the cylinder 50 moves the piston 40 backward with respect to the cylinder 50 against a reaction force of the springs 90.

A part of the annular bag 60 having being softened because of reduction in the internal pressure wraps around the front side of the lens 32, covers the surface of the lens 32, and protects the lens 32.

This suppresses the lens 32 from being damaged and increases the possibility of reuse of the camera 30 when the vehicle is repaired.

At this time, the front end portion of the annular bag 60 is disposed so as to project to the vehicle front side beyond the front end portion of the lens 32.

According to the embodiment described above, the following effects can be obtained.

(1) The lens 32 can be suppressed from being damaged by moving the camera 30 backward with respect to the cylinder 50 together with the piston 40 and by covering the surface of the lens 32 with the annular bag 60 when a minor collision occurs.

(2) Since is the exhaust member 61 that discharges the high pressure gas in the annular bag 60 into the cylinder 50 as the piston 40 moves with respect to the cylinder 50, the camera 30 can be protected by moving the piston 40 backward with respect to the cylinder 50 to retract the camera 30 into the cylinder 50.

In addition, the annular bag 60 can follow the surface of the lens 32 by the internal pressure of the annular bag 60 being reduced to soften the annular bag 60.

(3) Since there are the springs 90 that bias the piston 40 in a direction in which the lens 32 is moved from the cylinder 50, an appropriate angle of view and an appropriate imaging range can be obtained by moving the camera 30 to the front side together with the piston 40 when a collision does not occur.

(4) Since the annular bag 60 is formed of an elastic rubber-based material, the effects described above can be obtained with greater certainty.

(5) Since there are the springs 90 that serve as stroke regulation members that regulate the stroke of the piston 40 with respect to the cylinder 50 to prevent the piston 40 from being removed from the cylinder 50, the piston 40 and the camera 30 can be prevented from being removed from the cylinder and the camera 30 can be suppressed from being damaged when a collision occurs.

Modified Examples

The disclosure is not limited to the embodiment described above, and it is possible to make various modifications and changes, which also fall within the technical scope of the disclosure.

(1) The shape, structure, material, manufacturing method, disposition, quantity, and the like of each of the members constituting the vehicle and the camera support structure are not limited to the embodiment described above and can be changed as appropriate.

(2) The method of supplying a high pressure gas into the annular bag is not limited to the method in the embodiment and can be changed as appropriate.

For example, compressed air may be stored in an energy-absorbing foam agent disposed on the inner side of the bumper face, and the stored compressed air may be supplied into the cylinder when the foam agent collapses during a collision.

As described above, according to the disclosure, it is possible to provide a camera support structure that can suppress the lens from being damaged when a minor collision occurs.

In this scenario, the lens can be suppressed from being damaged by moving the camera backward with respect to the cylinder together with the piston when a minor collision occurs and by covering the surface of the lens with the annular bag.

In the disclosure, the exhaust member that discharges the gas in the annular bag into the cylinder in response to the movement of the piston may be provided.

In this scenario, since the gas in the annular bag is exhausted in response to the movement of the piston, the camera can be protected by moving the piston backward with respect to the cylinder to retract the camera into the cylinder.

In addition, the annular bag can follow the surface of the lens by the internal pressure of the annular bag being reduced to soften the annular bag.

In the disclosure, a biasing unit that biases the piston in a direction in which the lens is moved from the cylinder can be provided.

In this scenario, an appropriate angle of view and an appropriate imaging range can be obtained by moving the camera to the front side together with the piston when a collision does not occur.

In the disclosure, the annular bag may be formed of an elastic rubber-based material.

In this scenario, the effects described above can be obtained with greater certainty.

In the disclosure, stroke regulation member that regulates the stroke of the piston with respect to the cylinder to prevent the piston from being removed from the cylinder may be provided.

In this scenario, the piston and the camera can be prevented from being removed from the cylinder and the camera can be suppressed from being damaged when a collision occurs.

The invention claimed is:

1. A camera support structure for supporting a camera disposed adjacent to an exterior member of a vehicle, the camera support structure comprising:

a cylinder fixed to a vehicle body;

a piston inserted into the cylinder such that the piston is relatively displaceable along an axial direction of the cylinder, the piston being configured to support the camera;

an annular bag provided between a peripheral edge of a lens of the camera and an end portion of the cylinder, the camera projecting from the end portion of the cylinder, the annular bag being made of an elastic material, the annular bag being configured to store a gas with a pressure higher than an atmosphere pressure; and an interlocking member that couples the exterior member and the piston to each other, the interlocking member being configured to move the piston in a direction in which the lens is retracted into the cylinder in response to displacement of the exterior member, wherein the annular bag is configured to cover at least a part of a surface of the lens in response to movement of the piston.

2. The camera support structure according to claim 1, further comprising an exhaust member configured to discharge the gas in the annular bag into the cylinder in response to movement of the piston.

3. The camera support structure according to claim 1, further comprising a biasing unit configured to bias the piston in a direction in which the lens is moved from the cylinder.

4. The camera support structure according to claim 2, further comprising a biasing unit configured to bias the piston in a direction in which the lens is moved from the cylinder.

5. The camera support structure according to claim 1, wherein the annular bag is made of an elastic rubber-based material.

6. The camera support structure according to claim 2, wherein the annular bag is made of an elastic rubber-based material.

7. The camera support structure according to claim 1, further comprising a stroke regulation member configured to regulate a stroke of the piston with respect to the cylinder to prevent the piston from being removed from the cylinder.

8. The camera support structure according to claim 2, further comprising a stroke regulation member configured to regulate a stroke of the piston with respect to the cylinder to prevent the piston from being removed from the cylinder.

* * * * *